United States Patent
Santiago et al.

(10) Patent No.: US 11,468,204 B2
(45) Date of Patent: Oct. 11, 2022

(54) METHOD FOR MEASURING WRINKLES WITH REFERENCE TO TARGET SURFACE

(71) Applicant: Siemens Industry Software Inc., Plano, TX (US)

(72) Inventors: Nabori Santiago, Histon (GB); Marc Attar, Somerville, MA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/480,704

(22) PCT Filed: Sep. 26, 2017

(86) PCT No.: PCT/EP2017/074425
§ 371 (c)(1),
(2) Date: Jul. 25, 2019

(87) PCT Pub. No.: WO2019/063068
PCT Pub. Date: Apr. 4, 2019

(65) Prior Publication Data
US 2020/0233989 A1 Jul. 23, 2020

(51) Int. Cl.
*G06F 30/10* (2020.01)
*G06F 30/12* (2020.01)
*G06F 30/20* (2020.01)

(52) U.S. Cl.
CPC .............. *G06F 30/10* (2020.01); *G06F 30/12* (2020.01); *G06F 30/20* (2020.01)

(58) Field of Classification Search
CPC ........... G06F 30/10; G06F 30/12; G06F 30/20
See application file for complete search history.

(56) References Cited

U.S. PATENT DOCUMENTS

| | | | |
|---|---|---|---|
| 2016/0196361 A1* | 7/2016 | Viswanathan | G06F 30/23 76/107.1 |
| 2016/0236414 A1* | 8/2016 | Reese | B33Y 50/02 |
| 2018/0322621 A1* | 11/2018 | Craeghs | B23K 26/342 |

OTHER PUBLICATIONS

Leong M. et al: "Investigation of failure mechanisms in GFRP sandwich structures with face sheet wrinkle defects used for wind turbine blades", Composite Structures, vol. 94, No. 2, 2011, pp. 768-778; XP028112068, ISSN: 0263-8223, DOI:10.1016/J.COMPSTRUCT.2011.09.012 [retrieved on Oct. 1, 2011] section 4.1; figures 14, 16.
International search report and written opinion dated Jun. 20, 2018 for corresponding PCT/EP2017/074425.

* cited by examiner

*Primary Examiner* — Yanna Wu
(74) *Attorney, Agent, or Firm* — Wolter Van Dyke Davis, PLLC

(57) ABSTRACT

A method for generating a quantitative representation of material wrinkles in a computer-aided design (CAD) model, performed by a data processing system includes receiving in a CAD model a definition of a shape of a part and a material to be applied to the part. One or more parameters relating to the material are received and one or more of a plurality of quantifiable methods for modeling wrinkles resulting from the combination of part shape and material properties are selected. An output file is provided in a predetermined format summarizing the quantified result.

12 Claims, 3 Drawing Sheets

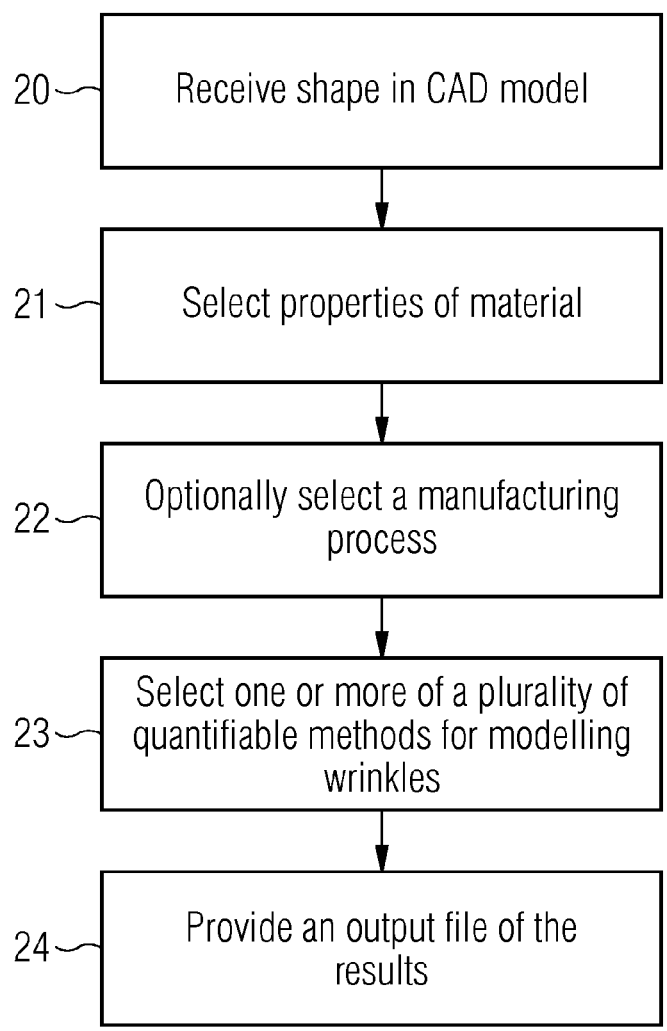

METHOD FOR MEASURING WRINKLES WITH REFERENCE TO TARGET SURFACE

CROSS REFERENCE TO RELATED APPLICATIONS

This application is the US National Stage of International Application No. PCT/EP2017/074425 filed Sep. 26, 2017, and claims the benefit thereof. The International Application is incorporated by reference herein in its entirety.

TECHNICAL FIELD

This present disclosure relates to the general field of computer aided design, drafting ("CAD"), manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for quantifying defects a computer aided design (CAD) system model in a modeling system.

A method for generating a quantitative representation of material wrinkles in a computer-aided design (CAD) model, the method performed by a data processing system, may comprise receiving in a CAD model a definition of a shape of a part and a material to be applied to the part; receiving one or more parameters relating to the material; selecting one or more of a plurality of quantifiable methods for modeling wrinkles resulting from the combination of part shape and material properties; and providing an output file in a predetermined format summarizing the quantified result.

A data processing system may include a processor; and an accessible memory, the data processing system particularly configured to carry out the steps of receiving in a CAD model a definition of a shape of a part and a material to be applied to the part; receiving one or more parameters relating to the material; selecting one of a plurality of quantifiable methods for modeling wrinkles resulting from the combination of part shape and material properties; and providing an output file in a predetermined format summarizing the quantified result.

A non-transitory computer-readable medium may be encoded with executable instructions that, when executed, cause one or more data processing systems to receive in a CAD model a definition of a shape of a part and a material to be applied to the part; receive one or more parameters relating to the material; select one of a plurality of quantifiable methods for modeling wrinkles resulting from the combination of part shape and material properties; and provide an output file in a predetermined format summarizing the quantified result of the representation of material wrinkles.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and system according to the present disclosure will now be described with reference to the accompanying drawings in which:

FIG. 5 is a flow diagram of a method of generating a quantitative representation of material wrinkles in accordance with the disclosed embodiments.

DETAILED DESCRIPTION

The embodiments of FIGS. 1 to 5 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

Figure 1:
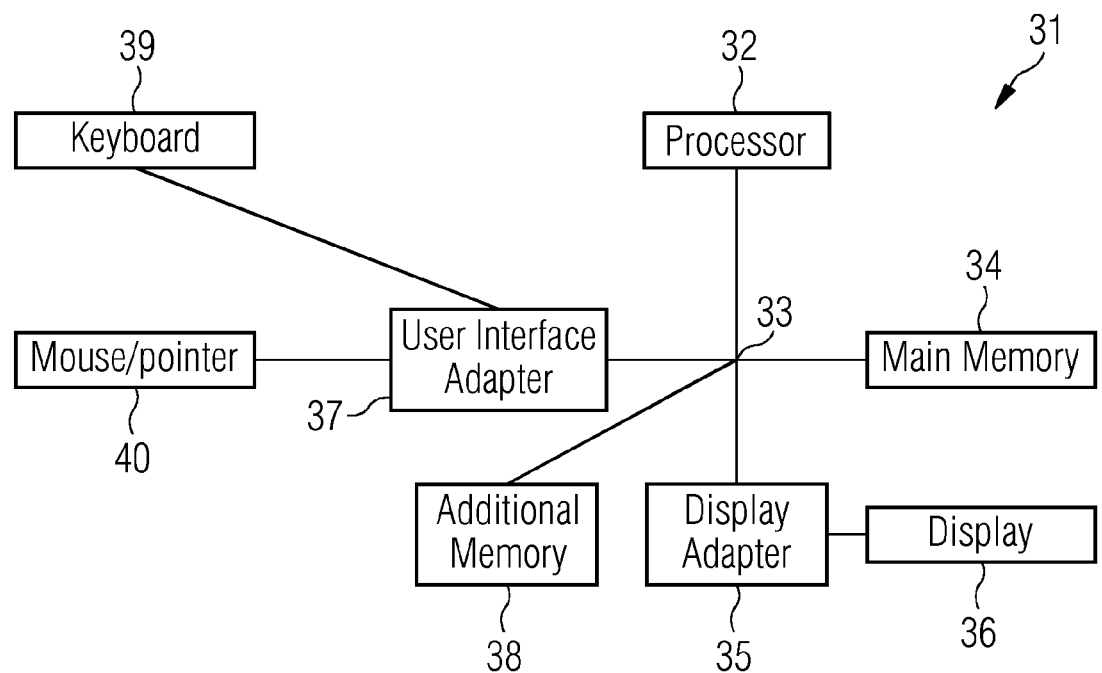
FIG. 1 is a block diagram of a data processing system in which an embodiment can be implemented.

FIG. 1 illustrates an example of a data processing system in which an embodiment of the present disclosure may be implemented, for example a CAD system configured to perform processes as described herein. The data processing system 31 comprises a processor 32 connected to a local system bus 33. The local system bus connects the processor to a main memory 34 and graphics display adaptor 35, which may be connected to a display 36. The data processing system may communicate with other systems via a wireless user interface adapter connected to the local system bus 33, or via a wired network, e.g. to a local area network. Additional memory 38 may also be connected via the local system bus. A suitable adaptor, such as wireless user interface adapter 37, for other peripheral devices, such as a keyboard 39 and mouse 40, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system. Further, systems may use other types of input devices to provide inputs for manipulating objects such as a mouse, pointer, touch pad, drawing tablet, track ball, joystick, keypad, keyboard, camera, motion sensing device that captures motion gestures, or any other type of input device capable of providing the inputs described herein.

In CAD systems, a user may wish to model a design for an object, generate manufacturing instructions for manufacturing that object, or make modifications to the design or manufacturing instructions. Modifications to the design in one format may have an unexpected or undesirable effect on the design in another format, in particular when determining production line processes, such as cutting and assembling material on parts which may have complex shapes, so it is desirable to achieve a degree of certainty in the outcome which is not simply reliant on individual subjective decisions before committing to production.

In composite parts, for example products constructed from multiple layers of material, such as a metal or plastic support layer, covered with one or more fabric layers, or multiple layers of fabric layered up to form a composite fabric, the direction of fibres in the composite fabric has a large impact on the strength and other performance factors of the manufactured part. Determining and measuring defects, i.e. differences in the manufactured part from the original part design, before the part is manufactured is a key point of the design process, as it allows the user to determine whether or not a part will meet their requirements before they manufacture it. Proceeding without this information may result in expensive errors, wasted material and consequential costs if the failure of the manufactured products to meet the design specification is only discovered at this late stage. The disclosure also applies to non-woven or non-knitted fibres, where the direction of the fibres would not be determinable, but the material so formed may be used to cover something and still forms wrinkles in the process Conventional manufacturing simulations on the part, which may be a single layer, or composite fabric, run simulations on the or each fabric layer of a part design and are only able to easily measure changes in fibre direction on the part surface. However, there is no reliable or standardised way of measuring properties of a wrinkle in the fabric in the simulation, since that is a situation where the fabric does not lie flat on the part surface.

Various defects may occur in the design of material or fabric composite parts, depending on the manufacturing process used to create the fabric composite parts. Wrinkling is one type of defect that may occur. Wrinkling is a case where the surface created by the composite fabric does not lie flat on the layup surface in such a way that, for a given area on the part surface, the area of fabric used to cover the surface is greater than the area on the part surface. This may have a variety of causes, including excessive tension or insufficient tension during manufacturing, folding during manufacturing, or excessive shearing of the material, amongst others.

Currently, there is no definitive, objective, way to characterize, or measure, properties of wrinkles based on a simulation of the manufacturing process. Subjective methods to detect wrinkles using image analysis of a part that has already been created have been proposed, but creating a part to determine the effect of the design is expensive in both cost and time. Image analysis on a simulated or created part is limited to showing location of wrinkles, without any way of measuring the severity of those wrinkles, as these methods rely on subjective interpretation of the severity by the user, or expert.

Measuring and characterizing wrinkles based on a simulation is information that would have a significant impact for the design process, in that it would allow the designer to immediately determine whether or not the design met safety and performance standards without spending the time and funds to create a physical test of the design. Without this cost, the designer would be able to apply more iteration to the design, allowing for more flexibility and opportunity to optimize the design before the result is sent to manufacturing.

Creating an objective measure of wrinkles is also significant for the analysis portion of the design process, as currently there is no standard way of including the effects of wrinkling in a computer aided engineering (CAE) simulation, where other aspects such as sheer deformation are determined. Current methods rely on the CAE user subjectively characterising a wrinkle, and selectively weakening the simulated material in the area that corresponds to that wrinkle.

Conventionally, evaluation of wrinkles based on a simulation has been dependent on a very subjective judgment by the designer, with possible input from others (i.e. such as an analyst or manufacturing engineer). A user may have predefined areas where they want to minimize wrinkling, but they have to judge whether the simulated wrinkles are acceptable, either by calling on previous experience, or perhaps by comparing against images of previously created parts that were determined to be acceptable.

Another subjective judgment of the wrinkle may be done when sending the wrinkled simulated data to CAE. Since CAE defines a mesh to match the part surface, a wrinkled simulation will not coincide with the defined mesh. To handle this case, CAE will often project the fibre directions from the simulated mesh onto their pre-defined mesh and then subjectively determine a "knockdown" factor, which is used to effectively weaken the material at that point in their simulation.

To address the issues described above, the present disclosure describes an objective method of quantifying wrinkles in a composite material part. For example, in a simulation, a mesh representing the final geometry of a fabric composite may be defined, as well as properties of the desired final surface. To provide an objective measure of wrinkles of the fabric at a given point on the surface, the normal of the surface at the point is determined as well as the intersection(s) of a ray, drawn from the surface point in the normal direction, with the simulation fabric.

For each of the intersection points, the distance from the surface point may be determined, and also the normal of the simulated material or fabric at the intersection point. Alone, or in any combination, three factors, the distance from the surface to the intersection point, the normal difference angle, i.e. the difference in angle between the surface normal and the fabric normal, and the number of intersection points, may be used to determine a measure of the wrinkle at that location.

A wrinkle factor may be defined as either a single floating point value, which may combine all three factors referred to above, or a two-part measure, with the first part combining the distance between the surface and intersection point and the normal difference angle as described above, and the second part being an indication of how many intersection points have been found for that wrinkle.

For simplicity, the examples herein illustrate a 2D cross-section of a 3D part, but the disclosure is not limited to this form and may also be applied to 3D surfaces, which have an extra degree of freedom and for which the difference in surface and mesh normals may equally well be determined.

Figure 2:
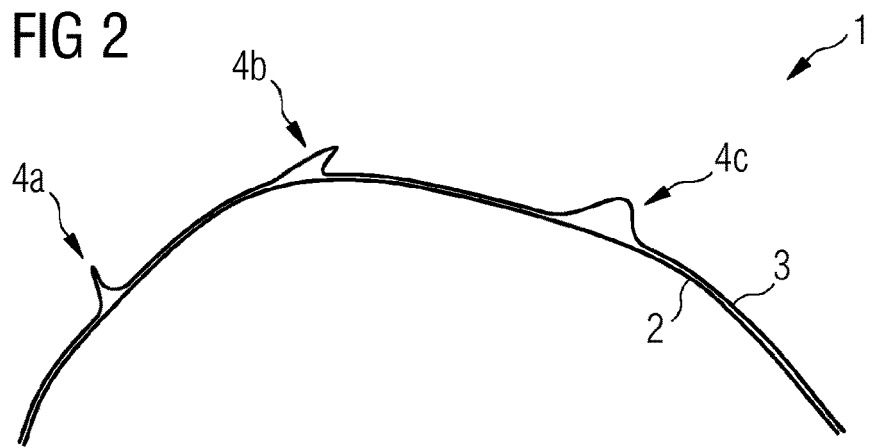
FIG. 2 illustrates an example of wrinkles in a sheet material to which the method of the present disclosure may be applied.

FIG. 2 illustrates the relationship between material and its lay-up surface, in this case a fabric layer and a surface layer in a fabric composite part. The design of the composite part 1 is simulated giving a design shape with a desired surface 2 and a simulation of the expected fabric surface 3, including folds, or wrinkles 4a, 4b, 4c. The desired surface 2 is the surface indicated by the part designer as the target surface and in an ideal situation, the created part will perfectly match this desired surface. The simulated fabric 3 is the result of a manufacturing simulation of the composite fabric. As can be seen in this example, there are multiple locations 4a, 4b, 4c where the simulated fabric 3 deviates from the desired surface 2.

Figure 3:
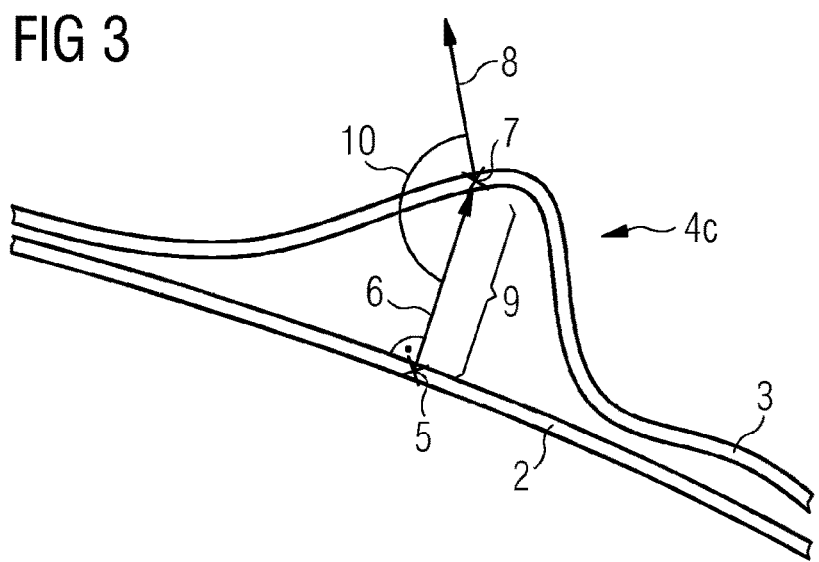
FIG. 3 illustrates an area of FIG. 2 in more detail.

FIG. 3 shows a close-up of one area 4c where the simulated fabric 3 deviates from the desired surface 2. For a surface point 5 on the desired surface 2, a ray is created in the direction of the surface normal 6. The location of any intersection of this ray with the simulated fabric 3 is determined, resulting in one or more intersection points 7. For each of these intersection points 7, a fabric normal 8, i.e. the normal of the simulated fabric 3 at that point, is determined. In addition, the distance 9 from the intersection point 7 to the surface point 5 may be measured. One or more of the normal difference 10, i.e. the angle between the fabric normal and the surface normal, the distance or distances 9 between the surface point 5 and the intersection point 7 and the number of intersection points 7 that are present may be used as factors in determining the degree of wrinkling, or wrinkledness of the fabric 3. The surface point 5 may be determined in various ways, including but not limited to, by directly defining a point on the desired surface 2, or by first determining a point on the simulated fabric 3 and then determining a corresponding point on the desired surface, using any of the methods known to those familiar with mapping points between two surfaces.

Figure 4:
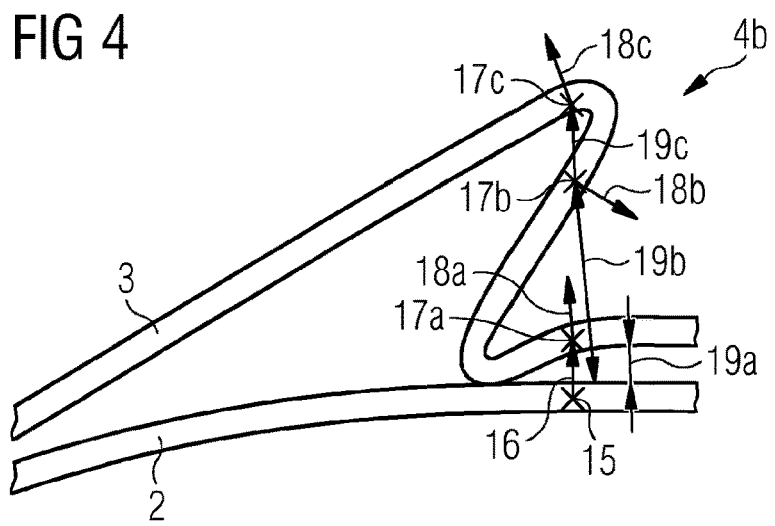
FIG. 4 illustrates another area of FIG. 2 in more detail.

FIG. 4 illustrates more detail of the wrinkle 4b of FIG. 2, having a greater degree of folding, such that a ray drawn from the chosen surface point 15 on surface 2, with surface normal 16, intersects at multiple points 17a, 17b, 17c on the simulated fabric 3. At each intersection point, there is a corresponding fabric normal 18a, 18b, 18c. For this type of wrinkle, the number of intersection points, in this example, three, may be used as a factor in determining the wrinkledness of the part. A determination of the wrinkle factor at each intersection point may be made and then combined, or the wrinkle factor at each intersection point 17a, 17b, 17c may be used separately. Alternatively, the wrinkle factor may be determined by other means, such as the two-part measure described above, with the first part combining the distance 19a, 19b, 19c between the surface 2 and intersection point 17a, 17b, 17c, with the normal difference angle and the second part being an indication of how many intersection points 17a, 17b, 17c have been found for that wrinkle.

FIG. 5 is a flow diagram of the steps of the method of the present disclosure. A definition of a shape of a product, or a desired surface shape is received 20 in the CAD model. Information about properties of a material to be applied to the shape during a manufacturing process is determined 21. This may be by selection as part of the simulation process, or predetermined, for example by the type of product, or the nature of the shape concerned. Material properties may include physical properties, how the material drapes, or performance characteristics. Information about the manufacturing process itself may be provided 22 if this is required. Manufacturing processes may differ according to the material being used, or the product being made and may have an impact on how any folds, or wrinkles in the material occur and affect properties of the final product.

One or more of the quantifiable methods described above are applied 23 in order to determine a wrinkle factor for the particular shape, material and, if appropriate, manufacturing process to be applied. From the wrinkle factor for each wrinkle, a measure is obtained of whether or not the final manufactured item will be able to meet the design specification. There may be limits applied to the value of wrinkle factor for the product and the simulated result can be compared with a limit in order to give an indication of whether the result is or is not acceptable. Results are provided 24 in an output file. The file may be chosen according to the requirement, for example, it may comprise manufacturing instructions for production line equipment, data for a finite element analysis package, or data defining how the manufactured item interacts with other parts of a larger products, such as a chair or sofa. The output file may form part of a larger file, for example the data may added to a CAD part file, along with all of the part geometry and other data. The format may be an export file, or spreadsheet, or a colour coded image indicating areas that require rework and areas that are acceptable.

Other factors may be taken into account in quantifying the effect of a wrinkle or wrinkles in the material, such as the number of folds detected at or near to a specified point on the surface, the extent of any loss of strength caused by the fold, as compared with the same material on a flat surface, or the volume of material that would be required to manufacture the part, as compared with a predefined amount of material allowed for that part. This predefined amount, or area, may be the amount of material required for a flat surface, increased by a scaling factor. The scaling factor may be based on experience or averaged over a large number of previous successful designs.

This method of this disclosure takes subjective judgments out of the determination of whether simulated winkles of a part design are acceptable or not. The use of the desired surface 2 as a comparison for the simulated fabric 3 gives a strong reference on which accurate wrinkle measurements may be made. Wrinkle measurement as described in this disclosure may be used for both automatic and assisted wrinkle analysis. The increased accuracy of the information obtained allows a final design package for manufacturing to be produced with fewer iterations and reduced cost and time, as there is no need to build prototypes for each change. Even at the concept stage, the method assists in excluding unsuitable designs and reducing the number of options to be considered. For parts which are to be integrated into a larger assembly when manufactured, the simulation data output may be used to determine their suitability within the overall manufacturing process before finally settling on a product design.

An operating system included in the data processing system enables an output from the system to be displayed to the user on display 36 and the user to interact with the system. Examples of operating systems that may be used in a data processing system may include Microsoft Windows™, Linux™, UNIX™, iOS™, and Android™ operating systems.

In addition, it should be appreciated that data processing system 31 may be implemented as in a networked environment, distributed system environment, virtual machines in a virtual machine architecture, and/or cloud environment. For example, the processor 32 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 31 may vary for particular implementations. For example the data processing system 31 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 31 may be connected to the network (not a part of data processing system 31), which can be any public or private data processing system network or combination of networks, as known to those of skill in the art, including the Internet. Data processing system 31 can communicate over the network with one or more other data processing systems such as a server (also not part of the data processing system 31). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 31 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

The invention claimed is:

1. A method for generating a quantitative representation of material wrinkles in a computer-aided design (CAD) model, the method performed by a data processing system and comprising steps of:
    receiving in a CAD model a definition of a shape of a simulated part and a material to be applied to the simulated part;
    receiving one or more properties of the material;
    selecting one or more of a plurality of quantifiable methods to generate a quantified result of determining a wrinkle factor for modelling simulated wrinkles resulting from a combination of simulated part shape, material properties and simulated manufacturing process used to form the simulated part, wherein the simulated wrinkles in the simulated part are based on a surface of the simulated part not laying flat on a layup surface such that an area of the surface of the simulated part used to cover an area of the layup surface is greater than the area of the layup surface; and
    providing an output file in a predetermined format summarizing the quantified result of determining the wrinkle factor;
    wherein the steps of the method are performed prior to physical manufacturing of the simulated part;
    wherein the quantifiable method to generate the quantified result of determining the wrinkle factor comprises determining a point on the surface on the simulated part at which one of the simulated wrinkles in the material occurs; and for that point carrying out:

determining a normal of the surface of the simulated part at the point, determining a normal of the material and deriving a normal difference angle therefrom;

determining a distance of the material from the surface at the point; and, determining a number of intersection points with the material, of a ray drawn from the point in a normal direction to the surface of the simulated part;

wherein the wrinkle factor comprises a combination of the normal difference angle, the distance of the material from the surface at the point and the number of intersection points with the material.

2. The method according to claim 1, wherein the method further comprises determining one of:

a number of folds detected in one of the simulated wrinkles at the point on the surface on the simulated part;

a strength loss of the material relative to a strength of the material on a flat surface; and, a volume of the material required to simulate the manufacture the simulated part, as compared with a predefined amount of material allowed for that simulated part.

3. The method according to claim 2, wherein the predefined amount of material allowed for that simulated part comprises the volume required on the flat surface times a scaling factor.

4. The method according to claim 1, wherein the method further comprises determining the simulated manufacturing process to be applied to the simulated part shape and the material having the received properties.

5. The method according to claim 1, further comprising comparing the value of the wrinkle factor with a limit value of the wrinkle factor to determine whether a manufactured simulated part using the simulated manufacturing process meets a design specification.

6. A data processing system for a computer-aided design (CAD) system, the data processing system comprising:

a processor; and an accessible memory, the data processing system particularly configured to carry out a method for quantifying representations of material wrinkles comprising:

receiving in a CAD model a definition of a shape of a simulated part and a material to be applied to the part;

receiving one or more properties of the material;

selecting one of a plurality of quantifiable methods to generate a quantified result of determining a wrinkle factor for modelling simulated wrinkles resulting from a combination of simulated part shape, material properties and simulated manufacturing process used to form the simulated part; and providing an output file in a predetermined format summarizing the quantified result of determining the wrinkle factor;

wherein the data processing system is configured to carry out the method prior to physical manufacturing of the simulated part;

wherein the quantifiable method to generate the quantified result of determining the wrinkle factor comprises determining a point on the surface of the simulated part at which one of the simulated wrinkles in the material occurs; and for that point, carrying out:

determining a normal of the surface of the simulated part at the point, determining a normal of the material and deriving a normal difference angle therefrom;

determining a distance of the material from the surface of the simulated part at the point; and, determining a number of intersection points with the material, of a ray drawn from the point in a normal direction to the surface of the simulated part;

wherein the wrinkle factor comprises a combination of the normal difference angle, the distance of the material from the surface at the point and the number of intersection points with the material.

7. The data processing system according to claim 6, further configured to carry out the steps of determining one of:

a number of folds detected in one of the simulated wrinkles at the point on the surface on the simulated part;

a strength loss of the material relative to a strength of the material on a flat surface; and, a volume of the material required to simulate the manufacture the simulated part, as compared with a predefined amount of material allowed for that simulated part.

8. A non-transitory computer-readable medium encoded with executable instructions that, when executed, cause one or more data processing systems to:

receive in a CAD model a definition of a shape of a simulated part and a material to be applied to the simulated part;

receive one or more properties of the material;

select one of a plurality of quantifiable methods to generate a quantified result of determining a wrinkle factor for modelling simulated wrinkles resulting from a combination of simulated part shape, material properties and simulated manufacturing process used to form the simulated part; and provide an output file in a predetermined format summarizing the quantified result of determining the wrinkle factor;

wherein the executable instructions are executed prior to physical manufacturing of the simulated part wherein the quantifiable method to generate the quantified result of determining the wrinkle factor comprises determining a point on the surface on the simulated part at which one of the simulated wrinkles in the material occurs; and for that point carrying out:

determining a normal of the surface of the simulated part at the point, determining a normal of the material and deriving a normal difference angle therefrom;

determining a distance of the material from the surface at the point; and, determining a number of intersection points with the material, of a ray drawn from the point in a normal direction to the surface of the simulated part;

wherein the wrinkle factor comprises a combination of the normal difference angle, the distance of the material from the surface at the point and the number of intersection points with the material.

9. A method for generating a quantitative representation of material wrinkles in a computer-aided design (CAD) model, the method performed by a data processing system and comprising steps of:

receiving in a CAD model a definition of a shape of a simulated part and a material to be applied to the simulated part;

receiving one or more properties of the material;

selecting one or more of a plurality of quantifiable methods to generate a quantified result of determining a wrinkle factor for modelling simulated wrinkles resulting from a combination of simulated part shape, material properties and simulated manufacturing process used to form the simulated part;

providing an output file in a predetermined format summarizing the quantified result of determining the wrinkle factor; and comparing the value of the wrinkle factor with a limit value of the wrinkle factor to determine whether a manufactured simulated part using the simulated manufacturing process meets a design specification;

wherein the steps of the method are performed prior to physical manufacturing of the simulated part;

wherein the quantifiable method to generate the quantified result of determining the wrinkle factor comprises determining a point on the surface on the simulated part at which one of the simulated wrinkles in the material occurs; and for that point carrying out:

determining the normal of the surface of the simulated part at the point, determining the normal of the material and deriving a normal difference angle therefrom;

determining a distance of the material from the surface at the point; and, determining a number of intersection points with the material, of a ray drawn from the point in the normal direction to the surface of the simulated part;

wherein the wrinkle factor comprises a combination of the normal difference angle, the distance of the material from the surface at the point and the number of intersection points with the material.

10. The method according to claim 9, wherein the method further comprises determining one of:
- a number of folds detected in one of the simulated wrinkles at the point on the surface on the simulated part;
- a strength loss of the material relative to a strength of the material on a flat surface; and,
- a volume of the material required to simulate the manufacture the simulated part, as compared with a predefined amount of material allowed for that simulated part.

11. The method according to claim 10, wherein the predefined amount of material allowed for that simulated part comprises a volume required on the flat surface times a scaling factor.

12. The method according to claim 9, wherein the simulated wrinkles in the simulated part are based on the surface of the simulated part not laying flat on a layup surface such that an area of the surface of the simulated part used to cover an area of the layup surface is greater than the area of the layup surface.

* * * * *